United States Patent [19]

Arora et al.

[11] Patent Number: 5,521,591
[45] Date of Patent: May 28, 1996

[54] SWITCHING NETWORKS WITH EXPANSIVE AND/OR DISPERSIVE LOGICAL CLUSTERS FOR MESSAGE ROUTING

[75] Inventors: Sanjeev Arora, Berkeley, Calif.; Thomas F. Knight, Jr., Belmont; Frank T. Leighton, Newton Center, both of Mass.; Bruce M. Maggs, Princeton, N.J.; Eliezer Upfal, Palo Alto, Calif.

[73] Assignee: Massachusetts Institute of Technology, Cambridge, Mass.

[21] Appl. No.: 218,318

[22] Filed: Mar. 25, 1994

Related U.S. Application Data

[63] Continuation of Ser. No. 732,031, Jul. 18, 1991, abandoned, which is a continuation of Ser. No. 488,693, Mar. 5, 1990, abandoned.

[51] Int. Cl.$^6$ .................................................. H01H 67/00
[52] U.S. Cl. .......................... 340/826; 340/825.8; 370/54; 379/271; 379/272
[58] Field of Search .................................. 340/826, 827, 340/825.8, 825.16; 370/54, 60, 94.1; 379/271, 272, 273, 274, 275, 277, 8, 9, 15, 16, 17

[56] References Cited

U.S. PATENT DOCUMENTS

| | | | |
|---|---|---|---|
| 3,851,122 | 11/1974 | Gibson | 179/175.23 |
| 4,349,702 | 9/1982 | Joel, Jr. | 179/18 GE |
| 4,651,318 | 3/1987 | Luderer | 370/60 |
| 4,731,825 | 3/1988 | Wojcinski et al. | 379/273 |
| 4,845,736 | 7/1989 | Posner et al. | 370/54 |
| 4,862,161 | 8/1989 | Schomers | 340/825.01 |
| 5,040,173 | 8/1991 | Richards | 340/826 |

FOREIGN PATENT DOCUMENTS

| | | |
|---|---|---|
| 0221360 | 5/1987 | European Pat. Off. . |
| 0229299 | 7/1987 | European Pat. Off. . |
| WO89/03566 | 4/1989 | European Pat. Off. . |
| 0328854 | 8/1989 | European Pat. Off. . |

OTHER PUBLICATIONS

Upfal, Eliezer, "An O(logN) Deterministic Packet Routing Scheme" Proceedings of the Twenty First Annual ACM Symposium on Theory of Computing, Seattle, Washington, May 15–17, 1989, pp. 241–250.

Leighton, Tom & Maggs, Bruce, "Expanders Might Be Practical: Fast Algorithms for Routing Around Faults on Multibutterflies" Proceedings of the Thirtieth Annual Symposium on Foundations of Computer Science, IEEE, Oct. 1989, pp. 384–389.

Fahlman, Scott E., "The Hashnet Interconnection Scheme," Department of Computer Science, Carnegie–Mellon University, Pittsburgh, Pennsylvania, Jun. 2, 1980, pp. 1–19.

Feldman, Paul et al., "Non–Blocking Networks (Preliminary Version)," Association for Computing Machinery, 1986, pp. 247–254.

Feldman, Paul et al., "Wide–Sense Nonblocking Networks," Siam J. Disc. Math., vol. 1, No. 2, May 1988, Copyright 1988 Society for Industrial and Applied Mathematics.

Pippenger, Nicholas, "Telephone Switching Networks," Proceedings of Symposia in Applied Mathematics, vol. 26, 1982, copyright 1982 American Mathematical Society, pp. 101–133.

Bassalygo, L. A. et al., "Complexity of an Optimum Non-blocking Switching Network Without Reconnections", Translated from Problemy Peredachi Informatsii, vol. 9, No. 1, pp. 84–87, Jan.–Mar. 1973. Origianl articla submitted Jun. 25, 1971, 1975 Plenum Publishing Corporation, 227 W. 17th St., New York, N.Y.

Arora, S., et al., "On–line Algorithms for Path Selection in Nonblocking Networks", *Proceedings of the 21st Annual ACM Symposium on Theory of Computing*, May 1990, pp. 149–158.

*Primary Examiner*—Brent A. Swarthout
*Assistant Examiner*—Andrew Hill
*Attorney, Agent, or Firm*—Hamilton, Brook, Smi8th & Reynolds

[57] ABSTRACT

A class of switching networks is comprised of expansive logical clusters and/or dispersive logical clusters. These clusters are of low degree. The class of networks include multibutterfly networks as well as multi-Benes networks. These networks provide for fault tolerance and routing and for efficient routing. Moreover, routing is provided in a non-blocking fashion.

19 Claims, 11 Drawing Sheets

SWITCHING NETWORKS WITH EXPANSIVE AND/OR DISPERSIVE LOGICAL CLUSTERS FOR MESSAGE ROUTING

RELATED PATENT APPLICATIONS

This application is a continuation of application U.S. Ser. No. 07/732,031 filed Jul. 18, 1991, abandoned, which is a continuation of Ser. No. 07/488,693 filed Mar. 5, 1990, abandoned, and PCT application No. PCT/US91/01513 filed Mar. 5, 1991.

BACKGROUND OF THE INVENTION

A switching network typically is made of input ports and output ports that are interconnected by switches and wires. The switching network serves primarily to correctly route messages from the input ports to the output ports. Each wire in the network serves as a conduit for transmitting a message from one of its ends to the other of its ends. The term wire, in this context, or the terms connection or connector, includes any means for communicating data between switches, such as electrical wires, parallel groups of wires, optical fibers, multiplexed channels over single wires, or free space radio or optical communication paths.

The switch is an atomic unit that resembles a switching network in function (i.e., a switch has inputs and outputs and connects the inputs to the outputs in any desired pattern). The degree of a switch is the number of inputs and outputs in the switch. For example, as shown in FIG. 1 a 2×2 switch 2 has a degree of four.

A switching network may route any kind of digital or analog data including voice or video signals. It can also route address information that specifies the correct output for the message, and routing information that helps direct the message to the correct output or that establishes communications links such as in a telephone network. In some networks, the routing is accomplished by setting switches so that input ports become directly connected to output ports (e.g., in a telephone network). In other networks, the inputs ports do not become directly connected to the output ports. Instead, the messages are routed as packets through the network in steps.

Switching networks are widely used to route messages and to establish communications among multiple parties. Typical examples of networks in which switching networks are used include telephone networks, data networks, computer networks, and interconnection networks in parallel data processing systems.

There are several varieties of switching networks that are classified by the manner in which messages are handled by the network. Common types of switching networks include packet-switching, circuit-switching, cut-through, and wormhole networks.

In a packet-switching network, packets are treated as atomic objects. At each time step, each wire in the packet-switching network can transmit an entire packet from one switch to another switch. If necessary, packets may be queued in buffers located at the switches or at the wires of the network. These networks are also often referred to as store-and-forward networks. The name "store and forward" is derived from the characteristic of the networks that packets are temporarily stored in the queues and then forwarded to the next destination in the network.

A circuit switching network is appropriate when messages are too large to be treated as atomic objects (such as packets). In this type of network, a dedicated path is established in the switching network between the sender and receiver of each message. The paths corresponding to different messages are disjoint (i.e., they do not share any wires). Once a path is established, the sender can transmit an arbitrarily long message to the receiver without interference from the other messages. This model is also called the lock-down model, and most closely resembles the approach adopted by current telephone networks.

The wormhole and cut-through networks are best classified as lying in a class situated between the packet and circuit-switching networks. In a wormhole network, a packet is assumed to consist of a sequence of flits (a flit is typically a bit or a byte). At the end of each wire is a buffer that can hold a small number of flits (typically two flits). A packet is not stored entirely in one buffer, but instead is spread out over a quantity of wires indicated by the packet length (number of flits) and by the buffer size. A packet can be thought of as a worm proceeding head-first through the network. Behind the head, each flit of the worm advances only if there is adequate space in the buffer at the end of the next wire to hold the flit. When the head moves, the buffer space it frees up trickles back to the tail, allowing the entire worm to move. If blocked, a packet compresses (like an accordion) to a length acceptable for the buffer size at the appropriate node. The integrity of the packet is also preserved (i.e., it cannot be cut in half by another packet). In a cut-through network, the buffer size is large enough that the entire packet can accumulate at a single node.

SUMMARY OF THE INVENTION

The present invention is comprised of a novel class of switching networks comprised of low-degree, expansive logical clusters and/or low-degree, dispersive logical clusters, and of methods described below for routing messages on these networks in an efficient on-line fashion. The methods for routing messages are superior to previously known methods in that they are fast, fault-tolerant, on-line, and non-blocking. These attractive features are attained by virtue of the expansion and/or dispersion properties of the logical clusters of the switching network.

In accordance with the present invention, a logical cluster comprises a first set and a second set of switches having inputs for receiving messages and outputs for outputting messages. The second set of switches is divided into one or more disjoint groups of switches. The first set of switches and possibly the second set of switches make local routing decisions. Connectors are provided for connecting the first set of switches to the second set of switches. The connectors interconnect the switches such that an output of each of the first set of switches is connected to an input of a switch in each of the groups of the second set of switches.

The connectors interconnect the first set of switches and the second set of switches so that the logical cluster exhibits an expansion property. In particular, there exists, for every set of k switches in the first set of switches, at least $\beta k$ switches in each group of the second set of switches are connected to the outputs of the first set of k switches. $\beta > 1$ and $k \leq \alpha N$, where N equals the number of input switches in the first set of switches. Further, $2\alpha\beta < 1$. The switches of the logical cluster may each have two input wires and two output wires. Preferably, $\alpha$ is at least 0.1 and approximately equal to 0.1, N is greater than or equal to 32 and $\alpha N$ is greater than or equal to 2.

The present invention also envisions a logical cluster that is dispersive. Specifically, for every set of k switches in the first set of switches, there are at least $\delta k$ switches in each group of the second set of switches that are connected to precisely one of the k switches in the first set of switches, where $k \leq \alpha N$, and N and k are positive integers. Both such logical clusters are ideal for use in multibutterfly switching networks and multi-Benes switching networks. $\delta$ and $\alpha$ are positive constants less than one.

The present invention also embodies a multibutterfly switching network made from the merger of individual butterfly switching networks. For purposes of referencing the butterfly switching networks it is helpful to number them 1 through d, where d is an integer. Each butterfly switching network has N input switches, and it is made of levels and rows of switches. The butterfly switching networks are merged such that given a set of permutations $\{\Pi^1, \ldots, \Pi^{(d-1)}\}$ where $\Pi^k = <\pi_0^k, \pi_1^k, \ldots, \pi_{lgn}^k>$ and $\pi_L^k: \{[0, N/2^L-1] \to [0, N/2^L-1]$, a switch in row $jN/2^L+i$ of level L of butterfly switching network k is merged with a switch row $jN/2^L+\pi_L^k(i)$.

Similarly the present invention embodies a multi-Benes switching network that is formed in a manner similar to that of the multibutterfly switching network. In particular, it is formed from d individual Benes switching networks numbered 1 through d. The merger can be described using a set of permutations. Specifically, given a set of permutations $\{\Pi^1, \ldots, \Pi^{(d-1)}\}$ where $\Pi^k = <\pi_0^l, \pi_1^k, \ldots, \pi_{2lgn}^k<$ and where $\pi_L^k: [0, N/2^{lgn-L}-1] \to [0, N/2^{lgn-L}-1]$ for $0 \leq L \leq \lg n$ a switch in row $jN/2^{lgn-L}+i$ of level L of Benes switching network number k is merged with a switch in row $jN/2^{lgn-L}+\pi_L^k(i)$ of level L of Benes switching network number k+1 for all $1 \leq k \leq (d-1)$, all $0 \leq i \leq N/2^{lgn-L}-1$, all $0 \leq j \leq 2^{lgn-L}-1$, and all $0 \leq L \leq \lg n$. Moreover for $\lg N \leq L \leq 2 \lg n$, $\pi_L^k: [0, N/2^{L-lgn}-1] \to [0, N/2^{L-lgn}-1]$, a switch in row $j N/2^{L-lgn}+i$ of level L of Benes switching network number k is merged with a switch in row $jN/2^{L-lgn}+\pi_L^k(i)$ for all $1 \leq k \leq (d-1)$, all $0 \leq i \leq N/2^{L-lgn}-1$, all $0 \leq j \leq 2^{L-lgn}-1$.

Examples of these switching networks (i.e. multibutterfly switching networks and multi-Benes switching networks) are where d=2, implying a twin multibutterfly or a 2-multi-Benes. Often times in the prior art it is common to select the permutations $\Pi$ so that they are an identity map. In other words, $i = \pi(i)$. This choice of $\Pi$ creates a dilated butterfly switching network or a dilated Benes switching network.

Such networks as the multibutterfly switching network and the multi-Benes switching network may be used to produce a very fault tolerant routing scheme. In particular, according to the present invention the output connections of each switch in a switching network organized into levels of switches are examined to determine whether the switch is available. The switch is declared unavailable if the examining step reveals that the switch is faulty or busy, i.e., unusable, or does not have a sufficient quantity of connections to available switches in each output group for each logical cluster of the switching network. Such unavailable switches are avoided in routing messages across the switching networks. To further boost fault tolerance, it preferred that the input switches of each logical cluster also be inspected to determine how many of the input switches are faulty. Where a number of input switches of a logical cluster that are faulty exceeds a predetermined threshold all of the switches in a logical cluster are declared faulty as well as any descendant switches of the logical cluster. Optimally this additional examining step proceeds from the $\log_2$ Nth level of switches backwards towards the 0 level of switches. In general, the fault tolerance approach may be expanded to heighten the integrity of routing of messages in a switching network. In accordance with this generalized method all switches are initially declared as available. If a switch is faulty, busy or connected to an insufficient number of properly operating switches it is declared unavailable. Messages are routed exclusively over available switches.

The present invention encompasses packet switching routing strategies as well as circuit switching routing strategies. In accordance with the packet switching method of the present invention, packets of information are routed across a switching network comprised of several levels of switches by first dividing packets of information into waves. Once the packets are divided into waves, the waves are sent from even levels of switches to odd levels of switches during a first time frame. In a second time frame, the waves of packets are sent from odd levels of switches to even levels of switches. In addition, it is preferred that colors are assigned to wires so that each switch is incident to one wire of each color. The colors have a predefined hierarchy. During either of the above sending steps, the packet are sent sequentially over the wires to interconnect the switches according to the color of the wires in the color hierarchy.

In general, a packet moves along a wire of a given color during a time frame if the packet seeks to move to a destination switch to which the wire is connected and if no other packet currently resides at the destination switch. However, if during a sending switch step, a packet seeks to move along a wire from a source switch to a destination switch and another packet from a later initiated wave currently resides at the destination switch, the position of the packets is swapped so that the packet previously at the source is at the destination and vice versa.

If, instead, a circuit switching strategy is desired, the present invention provides means for extending paths in a circuit switching network. According to this method, a proposal is sent from a current node position in the network. For each message path that seeks extension, the proposal is sent to each neighbor node in a desired direction of extension. Subsequent to the sending of a proposal, an acceptance is returned to the current node position from a neighbor node if the neighbor receives exactly one proposal. Upon acceptance, each message path is advanced to include an accepting neighbor node if it has one.

To further enhance this method of extending message paths, the additional step of extending place-holders may be utilized. The place-holders are sent on behalf of any message paths that are not moved forward during a given advancing step. The place-holders serve to reserve a place at a switch to which the message path seeks to extend. Thus, as the name implies the place-holders hold a place for a stalled message path. Additionally, it is preferred that cancellation signals are sent from message path to place-holders when the place-holders are no longer needed. The cancellation signals result in the removal of the place-holders when the signals are received. This prevents undue congestion within the switching network. It should be noted that the place-holders are advanced as if they are a message path. Further, when a place-holder receives cancellation signals from all message paths for which it is holding a place, the place-holder sends a cancellation signal to additional place-holders that are reserves a spot for the place-holder.

DETAILED DESCRIPTION OF THE PREFERRED EMBODIMENT

Logical Clusters

Figure 1:
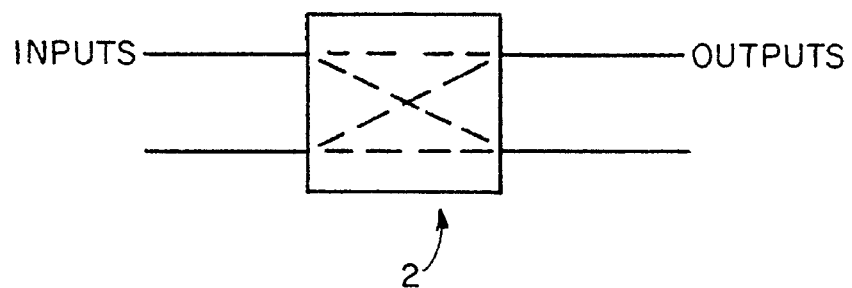
FIG. 1 depicts a 2×2 switch.
Figure 2:
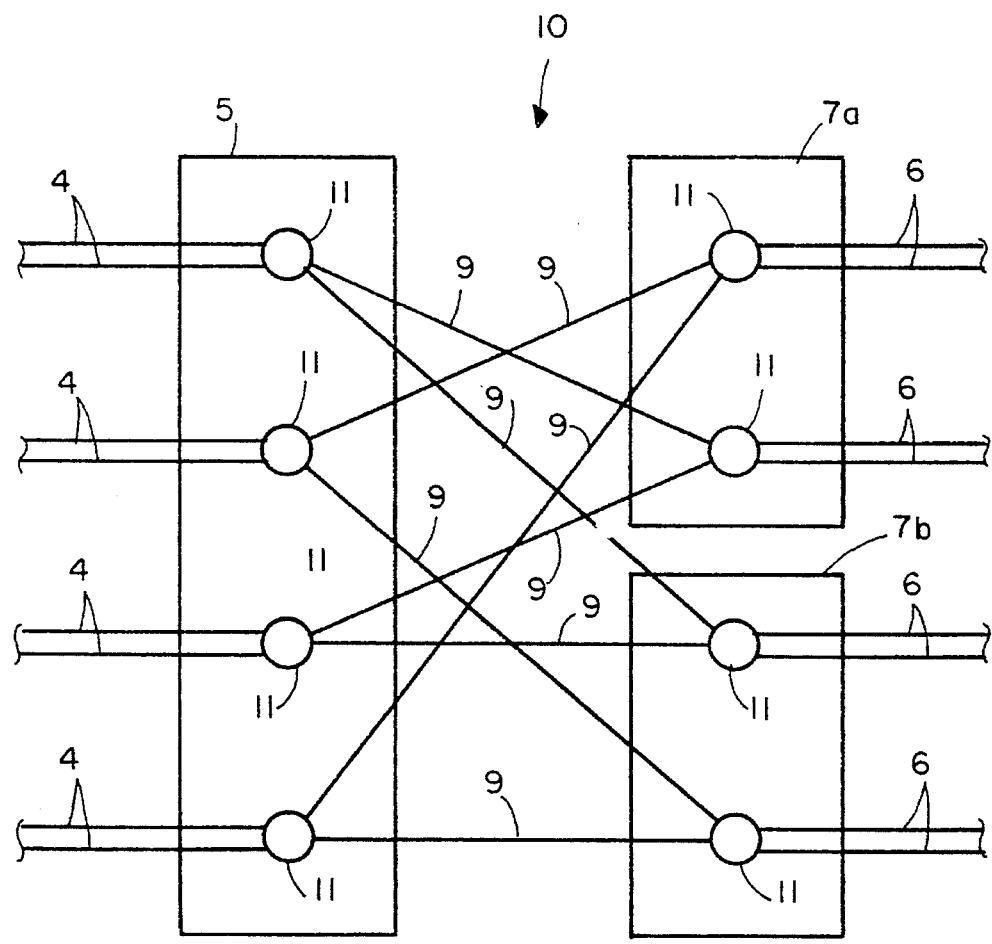
FIG. 2 shows a splitter logical cluster.

The basic building block of many switching networks is the logical cluster. A logical cluster is a group of switches and wires that perform a high level task. Examples of logical clusters are splitters, mergers and condensers. The splitter 10 shown in FIG. 2 splits a set of inputs into two sets of outputs. Specifically, the splitter 10 has a set of inputs 4 that lead into a set of 2×2 switches 11 that constitute an input block 5. Wires 9 connect the input block 5 of switches to the output blocks 7a and 7b of switches 11. The outputs of these switches 11 are the two sets of outputs of the splitter 10. Each switch 11 in the input block 5 is connected to at least one output switch 11 in each of the output blocks 7a and 7b. The splitter 10 serves to route the input 4 to the appropriate output block 7a and 7b. It does not matter which splitter output 6 a message is routed as long as each message is routed to a splitter output 6 in the correct output block 7a, 7b.

Figure 3:
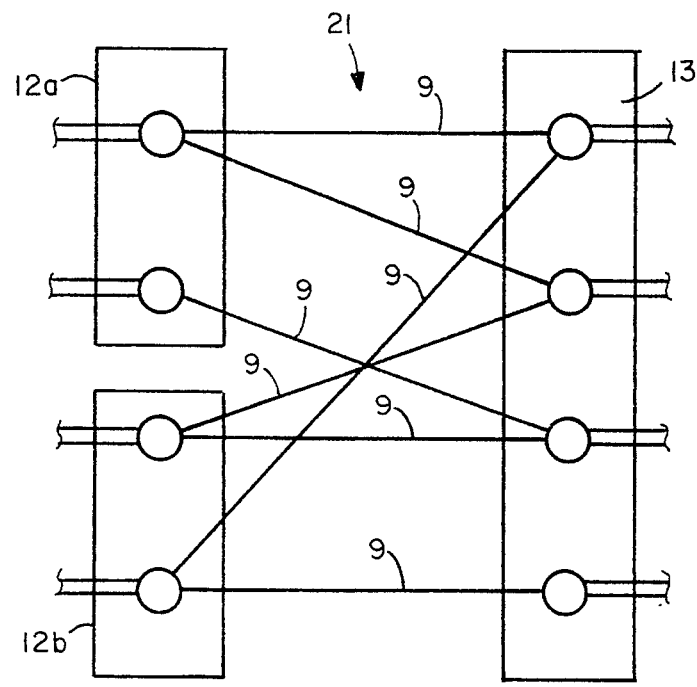
FIG. 3 illustrates a merger logical cluster.
Figure 4:
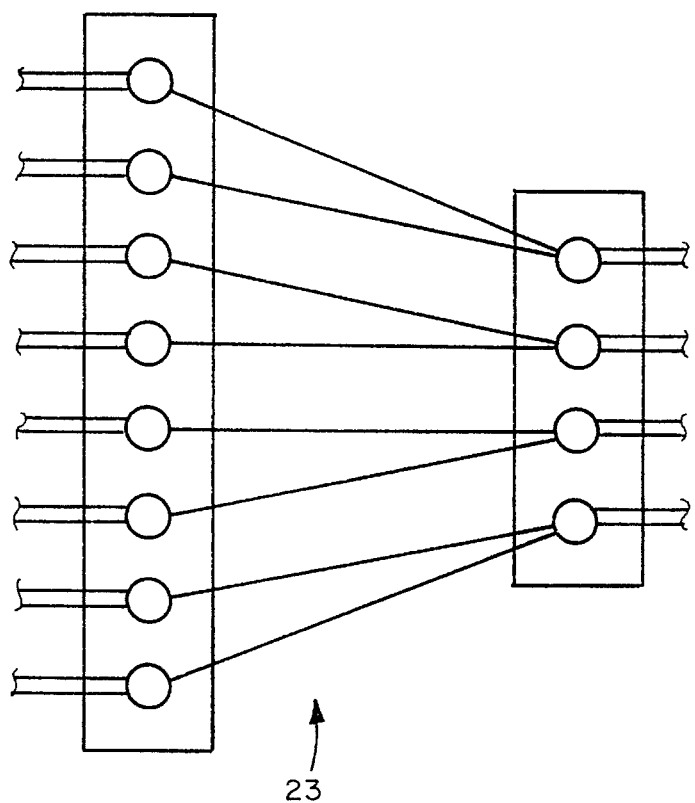
FIG. 4 shows a condenser logical cluster.

Another common variety of logical cluster is the merger 21 (FIG. 3). The merger 21 is comprised of multiple input blocks such as 12a and 12b shown in FIG. 3. In the merger 21 shown, the input blocks 12a and 12b lead via wires 9 into a single output block 13. Thus, the different sets of inputs feeding into the respective input blocks 12a and 12b are merged into a single set of outputs from output block 13. A third logical cluster that is used in switching networks is the condenser 23 (FIG. 4). It condenses a set of inputs into a lesser number of outputs.

Butterfly Networks

A butterfly network is a common example of a switching network. It is referred to as a butterfly network because the connections between nodes form a pattern resembling a butterfly. A butterfly network has the same number of inputs as it has outputs. The inputs are connected to the outputs via a set of switches organized into successive levels of switches. An N-input, N-output butterfly network has $\log_2 N+1$ (hereinafter $\log_2$ will be referred to as lg) levels of switches, each level having N 2×2 switches. For a message to travel from input to output, it must traverse at least one switch in each successive level.

Figure 5:
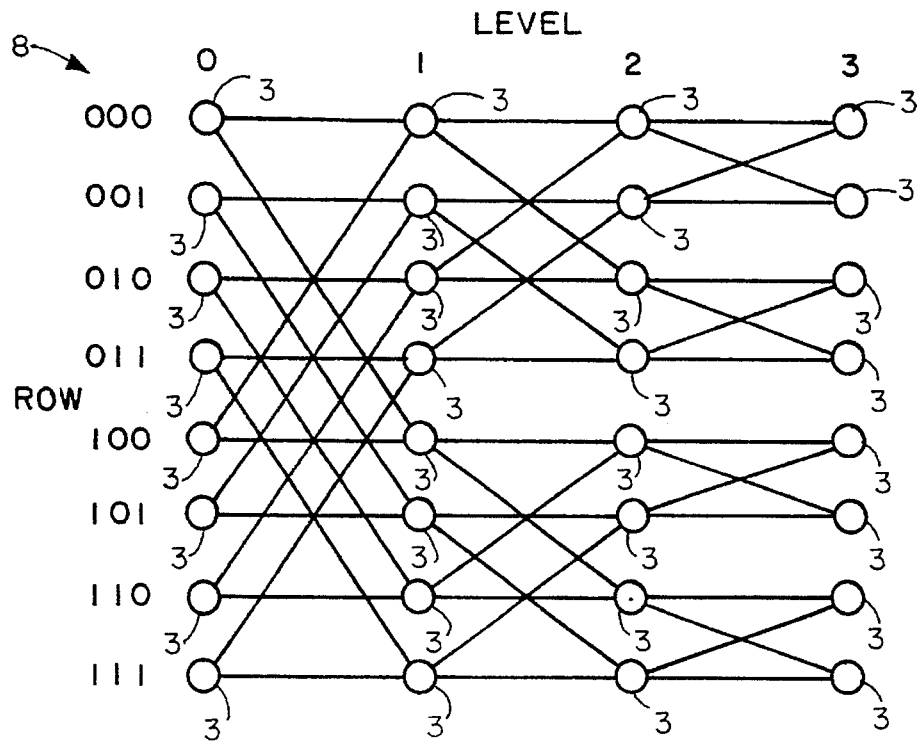
FIG. 5 is an illustration of a butterfly switching network.

An example butterfly network 8 is shown in FIG. 5. Each switch 3 in the butterfly 8 has a distinct reference label $<L,r>$, where L is its level, and r is its row. In an N-input butterfly, the level L is an integer between 0 and lgN, and the row r is a lgN-bit binary number. The inputs and outputs reside on levels 0 and lgN, respectively. For L<lgN, a switch labeled $<L,r>$ is connected to switches $<L+1,r>$ and $<L+1, r^{(L)}>$, where $r^{(L)}$ denotes r with the Lth bit complemented.

Figure 6:
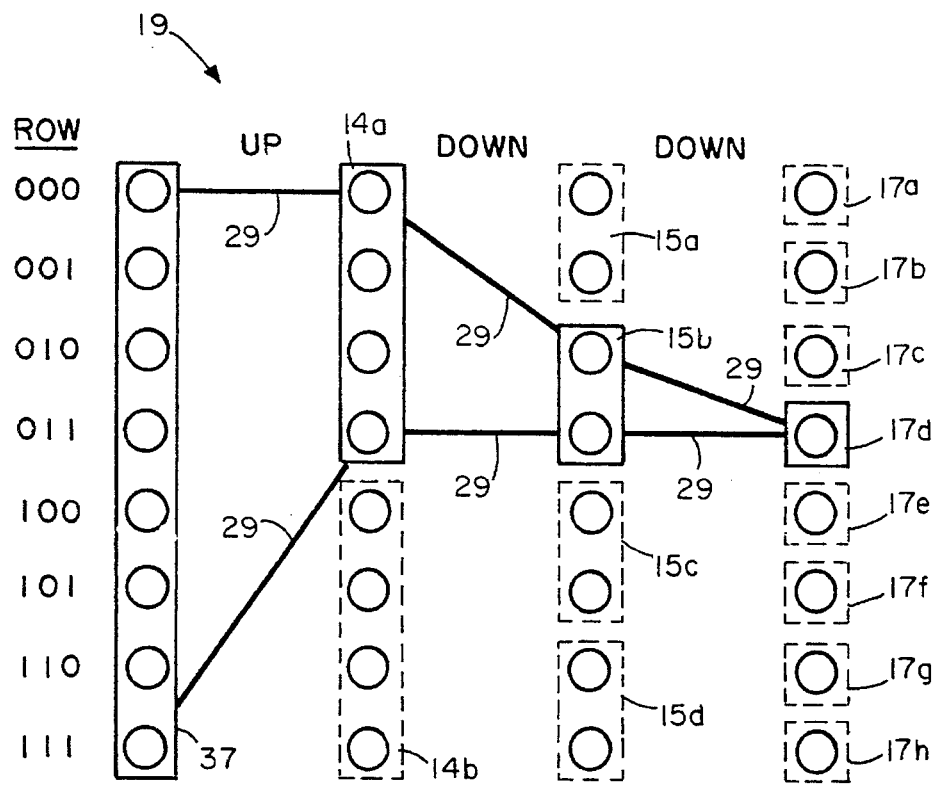
FIG. 6 depicts the blocks of a butterfly network and a sample routing path.

Butterfly networks are composed of sequences of splitters. The switches on each level of a butterfly network are partitioned into blocks according to which outputs they can reach. Another example butterfly network 19 is shown in FIG. 6. The first level of the butterfly network 19 can be viewed as a single block 7, since all of the inputs of the block 37 can reach all of the outputs of the block 37. The second level has two blocks: one block 14a consisting of those switches that can reach outputs whose labels start with 0, and the other block 14b (shown in phantom form) consisting of those outputs whose labels start with 1. Each block 37, 14a, 14b, is the input group of a subsequent splitter having two output groups. Other sample blocks for the higher levels include blocks 15a–15d and 17a–17h. Any pair consisting of an input and output of the butterfly is connected by a single logical (up-down) path through the butterfly. An example of such a logical path through a butterfly network is shown by the solid lines 29 in FIG. 4, indicating the decreasing number of switches that a message may choose from in the successive output blocks of the butterfly.

Fat-Tree

Figure 7:
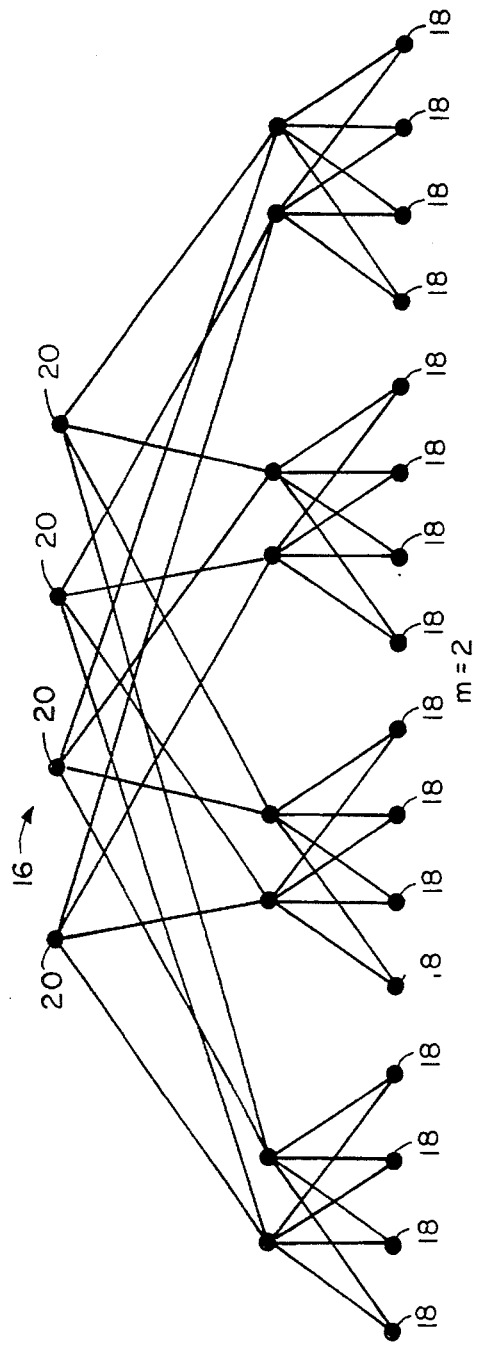
FIG. 7 depicts an example of a fat tree.

A fat-tree is another common example of a switching network that is made of splitters and mergers. A fat-tree network 16 is shown in FIG. 7. Its underlying structure is a complete 4-ary tree (i.e., every vertex has four wires leading to the next level of the tree). Each edge in the 4-ary tree corresponds to a pair of oppositely directed groups of wires called channels. The channel directed from the leaves 18 to the root 20 is called an up channel; the other channel is called a down channel. A group of up channels connecting four children to their parent forms a merger, while a group of down channels connecting a parent to its four children forms a splitter. A message routes up through the mergers until it can move down through the splitters to its destination. The capacity of a channel is the number of wires in the channel. The tree is referred to as "fat" because the capacities of the channels grow by a factor of 2 at every level. A fat-tree of height m has $M^2=2^2m$ leaves and $M=2^m$ vertices at the root.

Degree

A logical cluster of a switching networks is said to be low-degree if the degree of the switches in the logical cluster is a small fixed constant (e.g., 4, 8, or 16) that is independent of the number of inputs or outputs in the logical cluster. A switching network is said to be low-degree if the degree of the switches in the network is a small fixed constant independent of the number of inputs or outputs in the network. For practical implementation of these networks, the low-degree property is a requirement due to fixed component pinout.

Expansion

The present invention is concerned with low degree logical clusters exhibiting expansion and/or dispersion. An N-input logical cluster is said to be $(\alpha,\beta)$—expansive if for every small subset of k switches, i.e., k<$\alpha$N, every subset of k input ports (switches) collectively is connected to at least $\beta$k output ports in each group of outputs, where $\beta$>1 and $\beta$ and $\alpha$ are fixed threshold parameters independent of N. Typical values of $\alpha$ and $\beta$ are $\alpha$=⅓ and $\beta$=⅘. More simply, a logical cluster is said to be expansive if it is $(\alpha,\beta)$-expansive for some threshold values of $\beta$>1 and $2\alpha\beta$<1. Intuitively, the expansion property for a logical cluster implies that for all subsets of size k of the input switches to the cluster, there are more than k output switches in each output group which are connected to the subsets of size k. The possible paths that a message may assume, thus, expand between input and output. The extent to which there are more than k switches in the output group is determined by the parameter $\beta$. Hence, if $\beta$ is 2, there are twice as many output switches in each output group that are connected to the k input switches. k has a value less than the total number of input switches into the cluster N. The extent to which k is less than N is determined by $\alpha$.

A switching network comprised of expansive logical clusters is said to be expansive. Two examples of expansive switching networks are the multibutterfly network and the multi-Benes network, both of which will be discussed below.

Multibutterfly

A multibutterfly network is formed by merging butterfly networks in a somewhat unusual manner. In particular, given 2 N-input butterflies $G_1$ and $G_2$ and a collection of permutations ($\Pi=\pi_0, \pi_1, \ldots, \pi_{lgN}$) where $\pi_L$:[0,(N/$2^L$–1)] [0,(N/$2^L$–1)]a 2-butterfly is formed by merging the switch in row (jN/$2^L$)+i of level L of $G_1$ with the switch in row (jN/$2^L$)+$\pi_L$(i) of level L of $G_2$ for all 0≦i≦ (N/$2^L$)–1, all 0≦j<($2^L$–1), and all 0≦L≦lgN. The result is a 2-butterfly comprising an N-input lgN+1-level graph.

Figure 8:
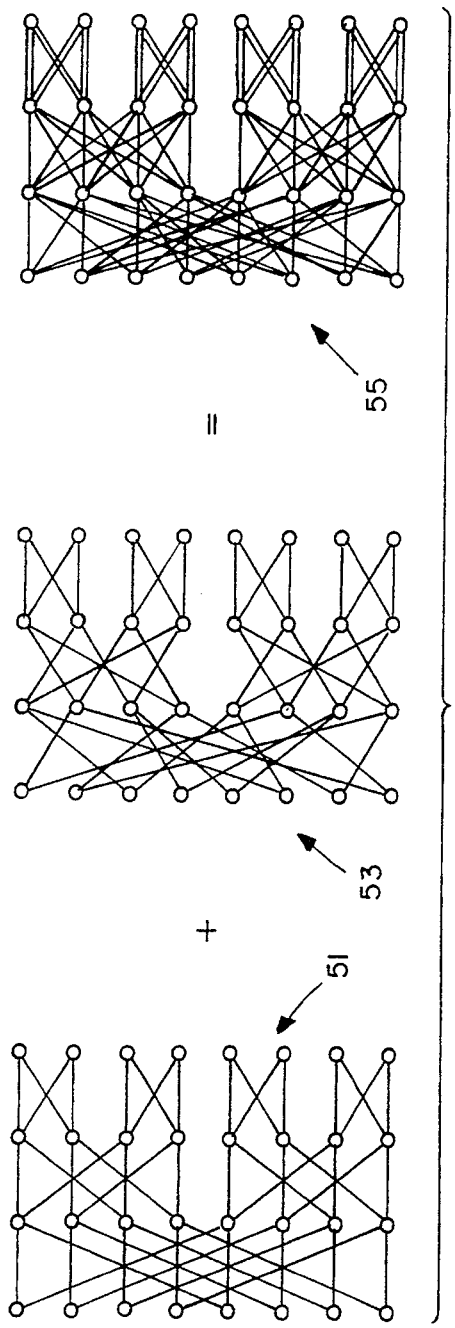
FIG. 8 shows two butterfly networks and the twin butterfly they form when merged.

In other words, a twin multibutterfly 55 is formed from merging two butterflies such as 51 and 53 in FIG. 8, each having N input switches. How the butterflies 51 and 53 are merged is determined by the permutation H. In particular, given a first switch in the first butterfly located on level L at a given row (i,e, row=jN/$2^L$+i), the first switch is merged with a second switch in the second butterfly also on level L, but at a row determined by the permutation (i.e. jN/$2^L$ +$\pi_L$(1)). The permutation maps an integer in the range of 0 to N/$2^L$–1 to a permuted integer also in the range of 0 to N/$2^L$–1.

Figure 9:
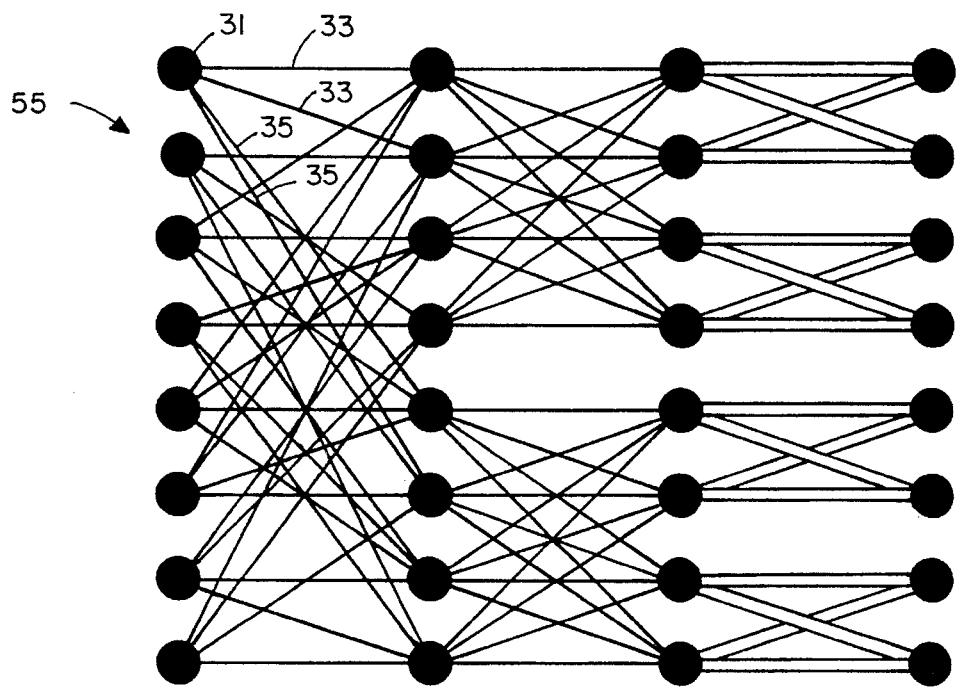
FIG. 9 shows an example twin multibutterfly switching network.

For an example of such a butterfly, see the multibutterfly 55 shown in an enlarged view in FIG. 9. Of the 4 output wires at a switch in the multibutterfly 55, two are up outputs and two are down outputs (with one up wire and one down wire being contributed from each butterfly). Thus, switch 31 has two up wires 33 and two down wires 35. Multibutterflies (i.e. d-butterflies) are composed from d butterflies in a similar fashion using d–1 sets of permutations $\Pi^{(1)}, \ldots, \Pi^{(d-1)}$ to produce a lgN level networks with 2d×2d switches.

The notion of up and down edges (or wires) discussed above relative to a 2-butterfly can be formalized in terms of splitters. More precisely, the edges from level L to level L+1 in rows (jN/$2^L$) to ((j+1)N/$2^L$)–1 in a multibutterfly form a splitter for all 0≦L<lgN and 0≦j≦$2^L$–1. Each of the $2^L$ splitters starting at level L has N/$2^L$ inputs and outputs. The outputs on level L+1 are naturally divided into N/$2^{L+1}$ up outputs and N/$2^{L+1}$ down outputs. All splitters on the same level L are isomorphic (i.e. they have the same number of inputs, the same number of outputs and the same wire connection patterns), and each input is connected to d up outputs and d down outputs according to the butterfly and the permutations $\pi_L^{(1)}, \ldots, \pi_L^{(d-1)}$. Hence, any input and output of the multibutterfly are connected by a single logical (up-down) path through the multibutterfly, but each step of the logical path can be taken on any one of d edges.

An important characteristic of a multibutterfly is the set of permutations $\Pi^{(1)}, \ldots, \Pi^{(d-1)}$ that prescribe the way in which the component butterflies are merged. For example, if all of the permutations are the identity map, then the result is the dilated butterfly (i.e., a butterfly with d copies of each edge).

Of particular interest to the present invention are multibutterflies that have expansion properties. A multibutterfly has expansion property $(\alpha,\beta)$ if each of its component splitters has expansion property $(\alpha,\beta)$. In turn, an M-input splitter has expansion property $(\alpha,\beta)$ if every set of k≦$\alpha$M inputs is connected to at least $\beta$k up outputs and $\beta$k down outputs for $\beta$>1.

If the permutations $\Pi^{(1)}, \ldots, \Pi^{(d-1)}$ are chosen randomly, then there is a good probability that the resulting d-butterfly has expansion property $(\alpha,\beta)$ for any d, $\alpha$, and $\beta$ for which $2\alpha\beta$<1 and $$d<\beta+1+(\beta+1+ln2\beta)/ln(1/2\alpha\beta) \tag{1}$$

It is not difficult to see that a multibutterfly network offers many advantages over a butterfly network. For example, whereas a butterfly contains just one path from each input port to each output port, a multibutterfly contains many paths from each input to each output port. Indeed, there is still just one logical (up-down) path from any input to any output, but this logical path can be realized as any one of several physical paths.

Another advantage of a multibutterfly (or any switching network comprised of expansive logical clusters) is that it is very hard for a large number of switches to become blocked by congestion or by faults. The reason is that for k inputs of an expansive logical cluster to become blocked, at least $\beta$k of the outputs would have to be blocked or faulty themselves. In a typical network like the butterfly, the reverse is true. One can block k inputs by congesting only k/2 outputs. When this property is cascaded over several levels of the network, the difference in performance between the butterfly versus the multibutterfly can be dramatic. For example, one fault can block 1000 switches 10 levels back in the butterfly, but 1000 faults would be necessary to block just 1 switch 10 levels back in the multibutterfly (if $\beta$=2).

Multi-Benes

Figure 10:
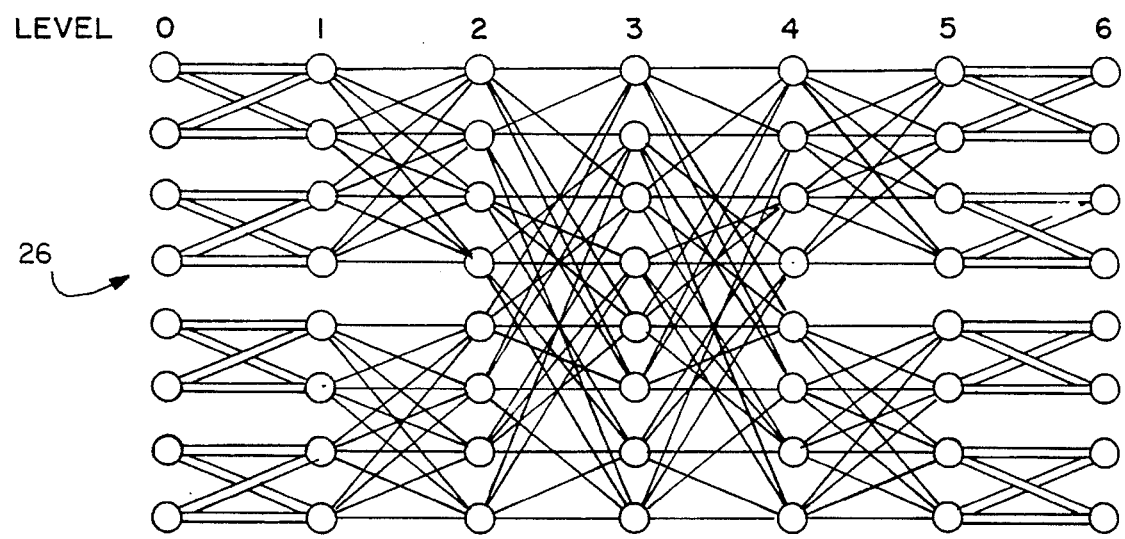
FIG. 10 shows an example 2-multi-Benes switching network.

Like a multibutterfly, a multi-Benes network is formed from merging networks together, specifically Benes networks. A 2-multi-Benes network 26 is shown in FIG. 10. An N-input multi-Benes network has 21 gN+1 levels labeled 0 through 21 gN. Levels lgN through 21 gN form a multibutterfly, while levels 0 through lgN form the mirror image of a multibutterfly. Thus, informally the 2 multi-Benes network can be viewed as a network made of two butterfly networks placed back to back.

As in the multibutterfly, the edges in levels lgN through 21 gN of the multi-Benes are partitioned into splitters. Between levels 0 and lgN, however, the edges are partitioned into mergers. More precisely, the edges from level L to level L+1 in rows $j2^{L+1}$ to $(j+1)2^{L-1}$ form a merger for all $0 \leq L+\lg N$ and $0 \leq j \leq N/2^{L+1}-1$. Each of the $N/2^{L+1}$ L <lgN and $0 \leq j \leq N/2^{L+1}=1$. Each of the $N/2^{L+1}$ mergers starting at level L has $2^{L-1}$ inputs and outputs. The inputs on level L are naturally divided into $2^L$ up inputs and $2^L$ down inputs. All mergers on the same level L are isomorphic, and each input is connected to $2d$ outputs. There is a single (trivial) logical path from any input of a multi-Benes network through the mergers on the first lgN levels to the single splitter on level lgN. From level lgN, there is a single logical path through the splitters to any output. In both cases, the logical path can be realized by many physical paths.

An M-output merger has expansion property $(\alpha,\beta)$ if every set of $k \leq \alpha M$ inputs (up or down) is connected to at least $2\beta k$ outputs where $\beta > 1$. With nonzero probability, a random set of permutations yields a merger with expansion property $(\alpha,\beta)$ for any d, $\alpha$, and $\beta$ for which $\alpha\beta < 1$ and $$2d < 2\beta + 1 + (2\beta + 1 + \ln 2\beta)/\ln(1/2\alpha\beta) \qquad (2)$$

A multi-Benes network has expansion property $(\alpha,\beta)$ if each of its component mergers and splitters has expansion property $(\alpha,\beta)$. The multibutterflies and multi-Benes networks considered herein are assumed to have expansion property $(\alpha,\beta)$ unless otherwise stated.

Dispersive Logical Clusters

The present invention is also concerned with dispersive logical clusters. An N-input logical cluster is said to be dispersive if for prespecified threshold parameters $\alpha$, $\delta$, for every $k \leq \alpha N$ and for every set of k inputs, there are at least $\delta k$ outputs ports (switches) in each group of the logical cluster that are connected to precisely one of the k input ports (switches). This definition of a dispersive logical cluster may be restated as: a logical cluster wherein every subset x of $k \leq \alpha N$ inputs in the cluster, there are $\delta k$ switches in x which have a neighbor in each output group that is not connected to any other switch in x. In other words, $\delta k$ nodes in x have a unique neighbor for each output group. This property is called the unique-neighbors property in S. Arora, T. Leighton and B. Maggs, On-line algorithms for path selection in a non-blocking network, *Proceedings of the 22nd Annual ACM Symposium on the Theory of Computing*, 1990 incorporated herein by reference. A switching network comprised of dispersive logical clusters is called a dispersive switching network.

A switching network with dispersive logical clusters offers substantial advantages over ordinary switching networks. Ordinary networks are typically unable to concurrently move all messages forward. In most instances, some messages are moved forward while others are terminated or queued for long periods of time. In a network with dispersive logical clusters, on the other hand, a message at an input can advance without fear of blocking other messages if the input is connected to an output which is coupled to no other inputs with a message. Given that in a dispersive logical cluster at least $\delta k$ outputs in each output group of a cluster are connected to precisely one input switch, at least a $\delta$ fraction of all messages can advance at every step in a dispersive logical cluster without ever blocking other messages.

Any splitter with the $(\alpha,\beta)$ expansion property has the $(\alpha,\delta)$ dispersion property where $\delta = 2\beta/d - 1$, provided that $\beta > d/2$. See Arora et al., supra. By Equation 1, it is evident that randomly generated splitters have the $(\alpha,\delta)$ dispersion property where $\delta$ approaches 1, as d gets large and as e gets small. Explicit constructions of such splitters are not known, however. Only multibutterflies with the $(\alpha,\delta)$ dispersion property for $\delta > 0$ will be discussed below. It should be noted that the $(\alpha,\beta)$ expansion property (where $\beta > d/2$) is a sufficient condition for the dispersion property, but by no means necessary. In fact, the existence of random splitters which have a fairly strong $(\alpha,\delta)$ dispersion property for small degree is proven in Arora et al.

Amongst the many methods for constructing expansive and/or dispersive logical clusters with low-degree is a method consisting of connecting the input ports to the output ports randomly so that every switch has the same degree. With high probability, the resulting logical cluster is expansive and dispersive if the number of connections from each input port to each output port is 3 or higher. Even if the there are only 2 connections from each input port to each output port, the concatenation of two logical clusters still has the expansive and dispersive properties with high probability.

Figure 11:
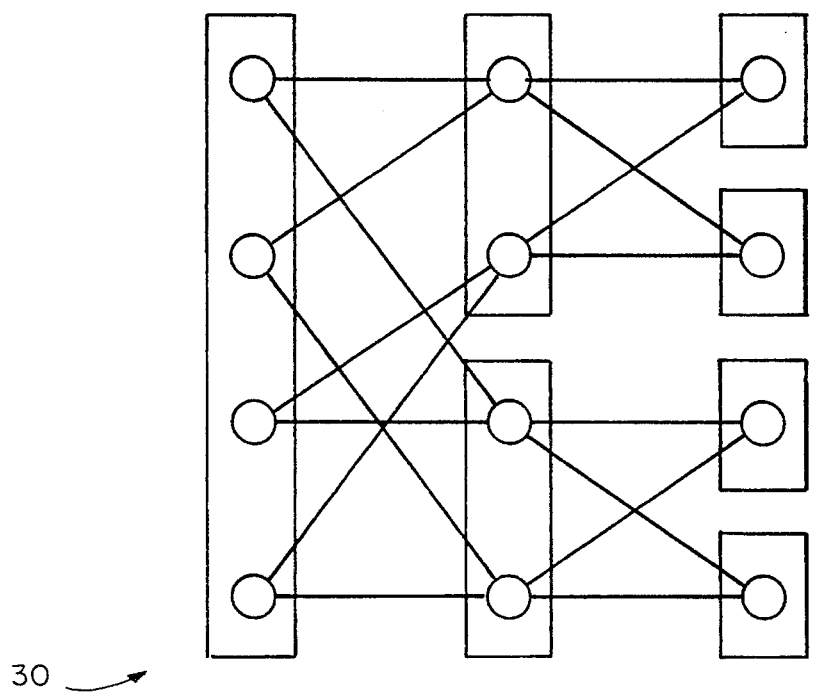
FIG. 11 is an illustration of a splitter having more than two levels.

Logical clusters such as splitters and mergers have been described thus far as only having a depth of 1 (i.e., input ports are switches that are directly connected to output ports). Nevertheless, the logical clusters can have more than one level. For example, if two depth 1 splitters are cascaded, a depth 2N splitter 30 is generated (See FIG. 11). Logical clusters with depth 1, 2, or 3 are of primary interest in the present invention. For logical clusters with depth 2 or more, an input port is connected to an output port if it can be connected to the output port by an appropriate setting of the switches in the logical cluster. The definitions of expansion and dispersion given above apply equally to such logical clusters. Using these definitions, it is possible to construct depth 2 logical clusters comprised of 2×2 switches that have the expansion and the dispersion property (see Arora, supra; and T. Leighton and B. Maggs, Expanders might be practical: fast algorithms for routing around faults in multibutterflies, *Proceedings of the 30th Annual Symposium on Foundations of Computer Science*, October 1989, pps. 384–389 which is incorporated herein by reference.

Routing Methods

Figure 18:
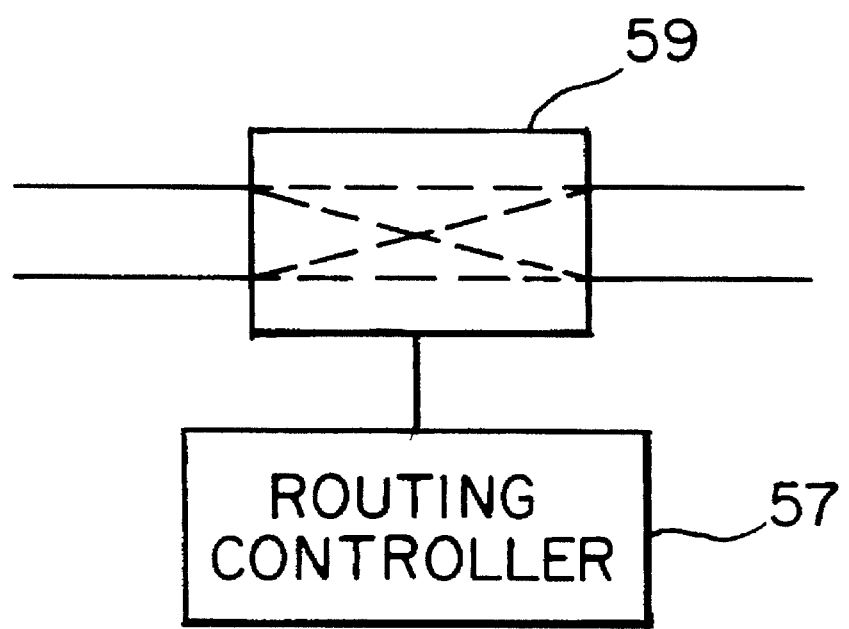
FIG. 18 shows a 2×2 switch having a routing controller for controlling operation of the switch to perform the processes of FIGS. 12–16.

In addition to the new types of switching networks, the present invention is concerned with methods for routing messages on such networks. These routing methods allow many messages to be routed to their correct destination quickly using only destination addresses and on-line control. On-line control refers to all decisions regarding switching being made locally by each switch without global information about the location and destinations of other packets as for example, shown routing controller 57 connected to switch 59 in FIG. 18. The routing methods also allow the messages to be routed around faulty switches and/or busy switches. A switch is said to be faulty if it is not functioning correctly, and it is said to be busy if it cannot be used to route any additional messages (i.e., all of its capacity is currently being used).

These features of the routing methods can be integrated into the notion of switch availability. In particular, the status of an input switch in a logical cluster is "available" if all of the following conditions are met:

1. the switch is not faulty;
2. the switch is not busy; and
3. the switch is connected to at least δ available output ports in each output group, where δ is a prespecified threshold value that is at least one.

Otherwise, the switch is said to be "unavailable". By only sending messages to "available" switches, the routing methods are able to avoid switches on multibutterflies that are faulty or busy. Such an approach also avoids the routing of a message into a position wherein the message might only be further routed to a faulty or busy switch.

Packet Switching

Figure 12:
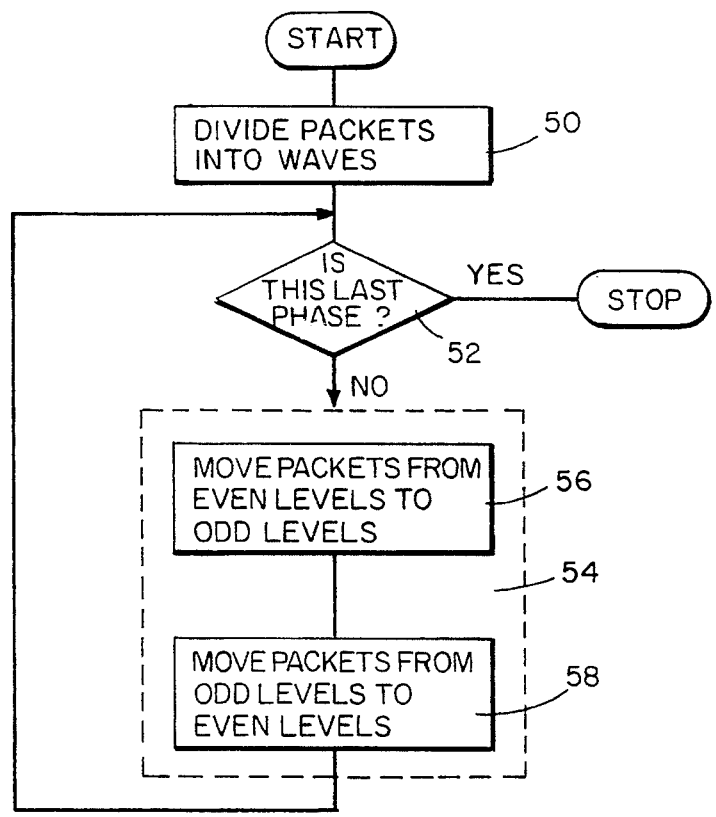
FIG. 12 is a flowchart of the major steps of the packet switching method of the present invention.

It is possible to run a variety of package switching methods, e.g., a greedy algorithm. Following is a preferred greedy algorithm. In describing the preferred packet switching method, it is assumed unless stated otherwise that the multibutterfly networks being used have expansion property $(\alpha,\beta)$ for $2\alpha<1$ and $\beta>1$. A flowchart outlining the major steps of the packet switching method is shown in FIG. 12. Initially, packets to be routed across the switching network are partitioned into waves (Step 50) so that at most one packet in each wave is destined for any set of Z contiguous outputs. One way to achieve such a partitioning into waves is to group packets into the same wave if they are in the same permutation and their destinations are congruent modulo Z. For P permutations to be routed, this approach of partitioning results in at most PL waves. In general, Z should be set to equal $1/(2\alpha)$, since then it is certain that at most $M/(2Z)=\alpha M$ packets in any wave pass through the up (or down) edges of any M-input splitter of the multibutterfly (for any M). This allows the $(\alpha,\beta)$ expansion property to apply to the set of inputs of any splitter occupied by the packets of a single wave at any time. (E.g., if k inputs of a splitter contain packets of a single wave that want to traverse up edges, then these inputs are connected to at least βk up outputs.) This is because packets going through the M/2 up (or M/2 down) splitter outputs can only be destined for the descendant set of M/2 contiguous multibutterfly outputs.

The routing of the packets proceeds in stages (see Steps 52 and 54), wherein each stage consists of an even phase (Step 56) and an odd phase (Step 58), and each phase consists of 2d steps. In even phases, packets are sent from even levels to the next odd levels (Step 56), and in odd phases, packets are sent from the odd levels to the next even levels (Step 58).

Figure 13:
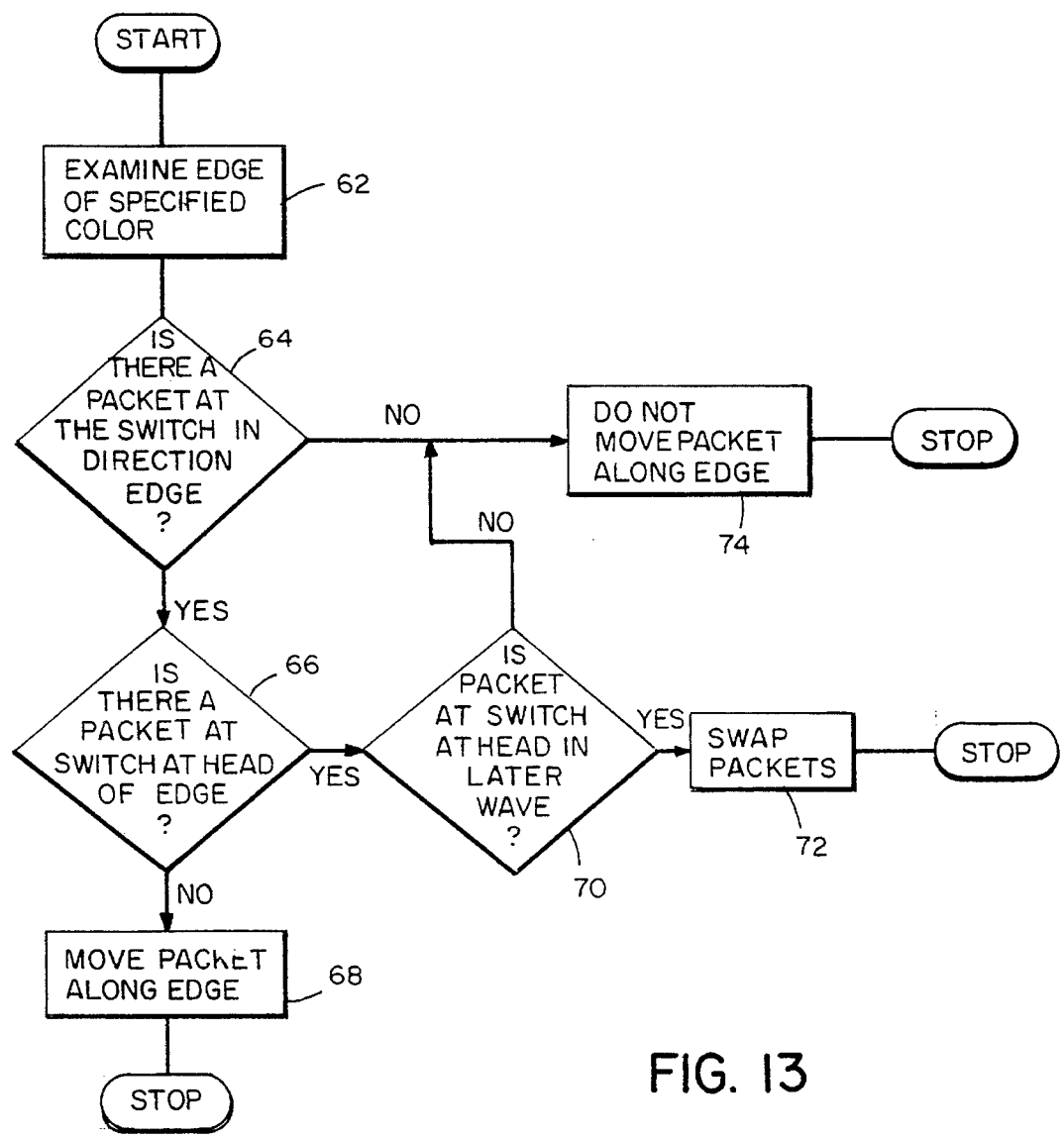
FIG. 13 is a flowchart of the edge coloring scheme employed in a packet switching method of the present invention.

The edges connecting levels are colored in 2d colors so that each node is incident to one edge of each color. In each phase, the edges are processed by color in sequence for all colors such that one step is dedicated per color. A flowchart of the activity performed in a step is provided in FIG. 13. For each step (see Step 62), a packet is moved forward along an edge with the color being moved during the step (Step 68) provided that there is a packet in the switch at the tail of the edge that wants to go in that direction (up or down) (Step 64) and further provided that there is no packet in the switch at the head of the edge (Step 66). Alternatively, if there is a packet in the switch at the head of the edge (Step 66) and if the packet is in a later wave than the packet at the tail of the edge (Step 70), the two packets are swapped (Step 72) so that the packet in the earlier wave moves forward. Otherwise, the packet is not moved (Step 74). Note that every switch processes and/or contains at most one packet at any step.

If there is only one permutation to route, then each input of the multibutterfly starts with one packet. If there are P permutations to be routed, however, it is useful to augment the front-end of the multibutterfly with P–1 levels of d (random) matchings so that the queue size of 1 at the input level can be preserved. The augmentation requires no more hardware than that necessary to augment the front end of each component butterfly with a P–1 cell linear array. Moreover, the augmentation ensures that the preprocessing levels have an $(\alpha,\beta)$–expansion property at least as strong as the first level. For notational purposes, these additional levels will be referred to hereinafter as levels –1, –2, ... , –(P–1).

The waves, edge coloring, and odd-even phases can be dispersed for most applications. Specifically, each packet is forwarded unless all queues ahead of it exceed some prespecified threshold of fullness. This approach is denoted as the greedy algorithm. For more details on the greedy algorithm, see Arora, supra; and Leighton, supra.

Fault Tolerance

The present invention also embodies a method for fault tolerance in networks such as the multibutterfly. The central idea of the method is to identify and remove those parts of the network that contain too many faulty switches to be used. The goal of this reconfiguration process is to salvage as much of the working hardware as possible while leaving largely intact the expansion property of the network. Once an appropriate set of inputs and outputs have been removed, the greedy algorithm described in the previous section can be applied to route packets between the remaining inputs and outputs.

Figure 14:
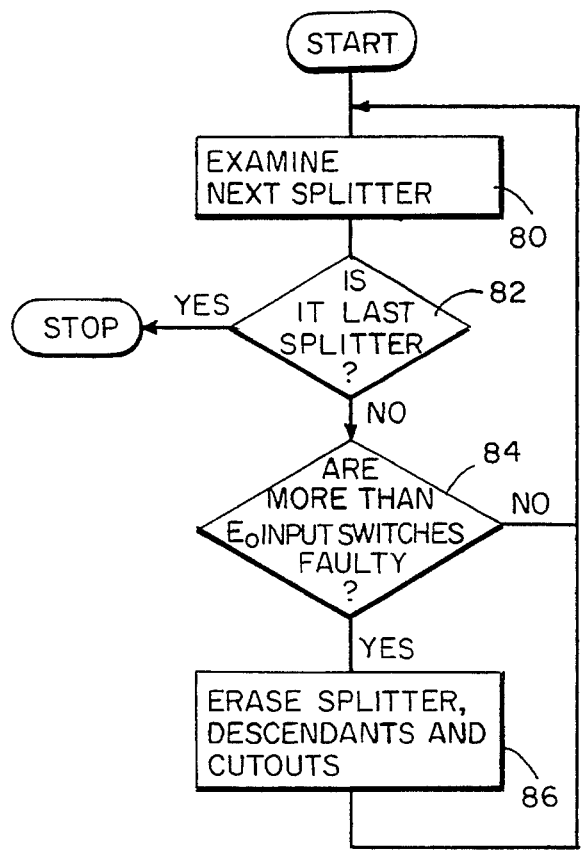
FIG. 14 is a flowchart of a method for striking faulty input splitters in a switching network to boost fault tolerance of the switching network.

The first step in the fault tolerance method is to specify the outputs to remove. A flowchart of the output removal scheme is given in FIG. 14. In particular, each splitter in the multibutterfly is examined (Steps 80 and 82). If more than an $\epsilon_0$ fraction of the input switches are faulty (Step 84), where $\epsilon_0=2\alpha(\beta'-1)$ and $\beta'=\beta-(d/2)$, then the splitter is "erased" from the network (Step 86). In addition all of its descendant switches and outputs are likewise "erased" (Step 86).

Figure 15:
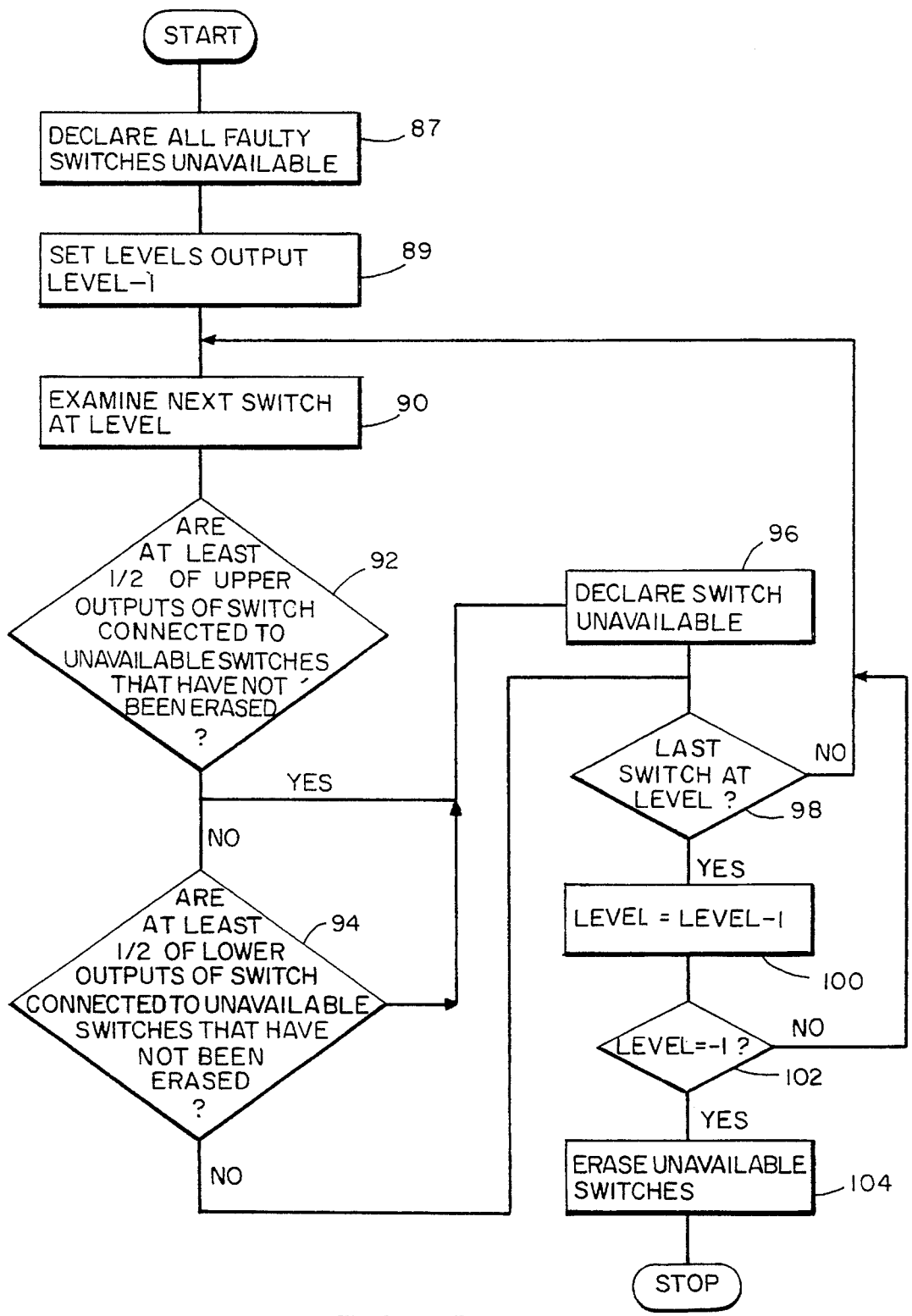
FIG. 15 is a flowchart illustrating a method for removing faulty switches in a switching network to increase fault tolerance.

The fault tolerance method next involves determining which inputs to remove (see flowchart in FIG. 15). The first step (87) in the process is to declare any faulty switch as unavailable. Working from the (lgN)th output level backwards (see Steps 89, 90, 100, and 102), each switch is examined (Box 90) to determine if at least half of its upper outputs lead to faulty unavailable that have not been erased (Step 92), or if at least half of its lower outputs lead to unavailable switches that have not been erased (Step 94). If so, the switch is declared (Step 96) to be unavailable. (But it is not erased. Where outputs lead to erased switches, they need not be declared unavailable in subsequent checking of preceding levels because the outputs from the erased switches are invalid). This process is repeated for all switches on a level (see Step 98) and for each level (Steps 98 and 100) until all levels have been examined (Step 102).

All the remaining unavailable switches are erased (Step 104). What is left is a network in which every input in every splitter is linked to d/2 functioning upper outputs (if the descendant multibutterfly outputs exist) and d/2 functioning lower outputs (if the corresponding multibutterfly outputs exist). Hence, every splitter has an $(\alpha,\beta')$ expansion property. Thus, it can be proven that the greedy algorithm still routes any permutation on the remaining inputs and outputs quickly. See Arora, supra; and Leighton, supra for more details.

Circuit Switching

The above described routing method works well for packet switching. It is not as appropriate for direct application to circuit switching. Nevertheless, a similar approach can be used for circuit switching. The circuit-switching method adopts an approach similar to the packet switching method but additionally makes use of the dispersion property of the logical clusters.

In order for the circuit-switching algorithm to succeed, the multibutterfly network must be lightly loaded by some fixed constant factor Z. Thus, in an N-row multibutterfly network, connections are made only between the N/Z inputs and outputs in rows that are multiples of Z. Since the other inputs and outputs are not used, the first and last $\lg Z$ levels of the network can be removed, and the N/Z inputs and outputs can each be connected directly to their Z descendants and ancestors on levels $\lg Z$ and $\lg N-1 \lg Z$, respectively.

Figure 16:
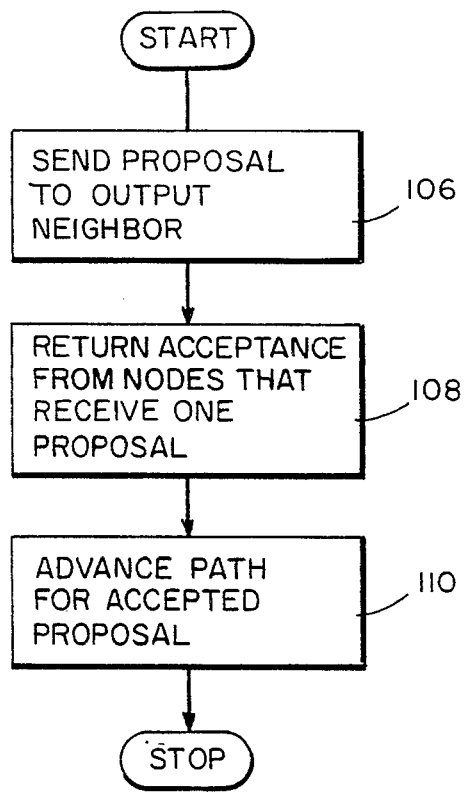
FIG. 16 is a flowchart of the major steps of a circuit switching algorithm.

It is relatively easy to extend paths from one level to the next in a multibutterfly with the $(\alpha,\delta)$ dispersion property. The reason is that those paths at switches with unique neighbors can be trivially extended without worrying about blocking any other path trying to reach the next level. By proceeding recursively, it is easy to see that all the paths can be extended from level L to level L+1 (for any L) in $\log(N/Z2^L)/\log(1/L-\delta)$ steps. When such a recursive approach is adopted, the method proceeds in steps wherein each "step" of a switch node making a local routing decision consists of (see flowchart in FIG. 16):

1. sending out a "proposal" for every path still waiting to be extended to the output (level L+1) neighbors in the desired direction (up or down) (Step 106);
2. sending back acceptance of the proposal from every output node that receives precisely one proposal (Step 108). If more than one proposal is received, none are accepted;
3. advancing every path receiving an acceptance to one of its accepting outputs on level L+1 (Step 110).

Splitters connecting level L to level L+1 have $M=N/2^L$ inputs. At most M/Z paths can pass through splitters connecting level L and level L+1 by definition of Z. Since $Z>1/\alpha$, the set of switches containing paths needing to be extended has a size of at most $\alpha M$. The $(\alpha,\delta)$ dispersion property can be applied to ensure that at each step, the number of paths still remaining to be extended decreases by a $(1-\delta)$ factor. Hence, all of the paths are extended in $\log(N/Z2^L)/\log(1/(1-\delta))$ steps, as claimed.

By using the path extension algorithm just described on each level in sequence, all of the paths can be constructed in $$\sum_{l=0}^{\lg N-1} \frac{\log \frac{N}{Z2^l}}{\log \frac{1}{1-\delta}} \leq \frac{\log^2 \frac{N}{Z2^l}}{2\log \frac{1}{1-\delta}} = O(\log^2 N)$$

bit-steps. To construct the paths in O(logN) bit-steps the algorithm may be modified. Specifically, given a fraction $<\alpha$ of paths that need to be extended at an M-input splitter, the method does not wait O(logM) time for every path to be extended before it begins the extension at the next level. Instead, it waits only O(1) steps, in which time the number of unextended paths falls to a fraction $\rho$ of its original value, where $\rho<1/d$. Now the path extension process can start at the next level. The danger here is that the $\rho$ fraction of paths left behind may find themselves blocked by the time they reach the next level, and so it is necessary to ensure that this will not happen. Therefore, stalled paths send out place-holders to all of their neighbors at the next level, and henceforth the neighbors with place-holders participate in path extension at the next level as if the place-holders were paths. Of course, the neighbors holding place-holders must in general extend in both the upper and the lower output portions of the splitter, since they do not know yet which path will ultimately use them.

It is worth noting that a place-holder not only reserves a spot that may be used by a path at a future time, but also helps to chart out the path by continuing to extend ahead. In order to prevent place-holders from multiplying too rapidly and clogging the system (since if the fraction of inputs of a splitter which are trying to extend rises above $\alpha$, the path extension algorithm may cease to work), it is necessary to ensure that as stalled paths get extended, they send cancellation signals to the place-holder nodes ahead of them to indicate that the place-holder nodes are no longer needed. When a place-holder node receives cancellation signals from all the nodes for which the place-holder node was holding a place, the place-holder node is removed and ceases to extend anymore. In addition, the place-holder nodes send cancellations to any nodes ahead of them that may be holding a place for them.

The O(logN)-step algorithm for routing paths proceeds in phases consisting of the following two types of steps:

1. Steps of passing cancellation signals. There are C such steps. The cancellation signals travel at the rate of one level per step;
2. Steps of extending from one level to the next. There are T such steps. In this time, the number of stalled (i.e., unextended) paths at each splitter drops by at least a factor of $\rho$, where $P \leq (1-\delta)^T$.

Each path is restricted to extend forward by at most one level during each phase. The first wave of paths and place-holders to arrive at a level is referred to as the wavefront. The wavefront moves forward by one level during each phase. If a path or a place-holder in the wavefront is not extended in T steps, it sends place-holders to all of its neighbors at the end of the phase. It is assumed that $C \geq 2$ so that cancellation signals have a chance to catch up with the wavefront. It is also assumed that $d \geq 3$. (See Arora, supra for more details and a proof that the algorithm quickly establishes all paths).

Nonblocking Networks

Figure 17:
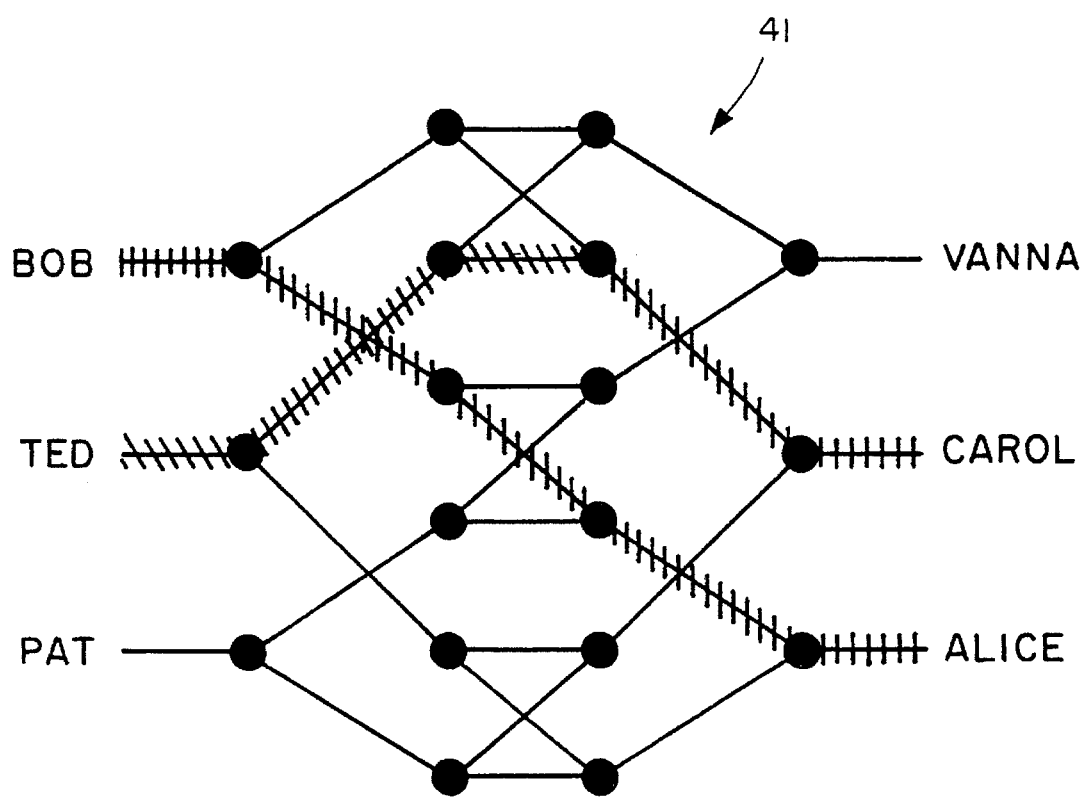
FIG. 17 depicts a non-blocking network.

The preceding method works well for static message routing problems (i.e., for problems in which the messages to be routed all start at the input ports of the circuit at the same time). In some applications, however, such as telephone networks, the messages to be routed arrive at the input ports at different times. In such cases, it is desirable to route the messages in a nonblocking manner. The goal of such routing switches is to interconnect the terminals and switches so that any unused input-output pair can be connected by a path of unused switches, regardless of other paths that exist at the time. Such a network is said to be nonblocking. Nonblocking in this strong sense is to be distinguished from the rearrangeable properties of Benes networks which allow further connections but require rerouting of existing connections. The 6-terminal graph 41 shown in FIG. 17 is nonblocking since no matter which input-output pairs are connected by a path, there is a node-disjoint path linking any unused input-output pair. As such, if Bob is talking to Alice and Ted is talking to Carol, then Pat can still call Vanna.

To satisfy connection requests in a non-blocking multi-Benes network, an algorithm is employed that establishes a path from an unused input to an unused output in O(logN) bit-steps, where N is the number of rows in the network. In the description of the algorithm that follows, it is assumed that at most one input tries to access any output at a time, and that each input accesses at most one output at a time.

The central idea behind the nonblocking routing algorithm used for an expansive switching network is to treat the switches through which paths have already been established as if they were faulty and to apply the previously described status propagation techniques to the network. In particular, a node is defined as busy if there is a path currently routing through it. At the start, all busy nodes are said to be unavailable. A node is defined recursively to be unavailable if all of its up outputs or if all of its down outputs are unavailable. More precisely, switches are declared to be unavailable according to the following rule. Working backwards from level 21 gN−1 gZ to level lgN, a switch is declared unavailable if either all d of its up edges or all d of its down edges lead to unavailable switches. From level lgN −1 to level 1 gZ, a switch is declared unavailable if all 2d of its outputs lead to unavailable switches. A switch that is not unavailable is said to be available.

After the status propagation process, every available switch in the first half of the network has an output that leads to an available switch, and every available switch in the second half has both an up output and a down output that leads to available switches. Furthermore, since at most a 2α fraction of the switches in each merger on level 1 gZ are unavailable, each of the N/Z inputs has an edge to an available switch on level Z. At the other end, each of the N/Z outputs can be reached by an available switch on level 21 gN−1 gZ. As a consequence, a path can be established through available switches from any unused input to any unused output in O(logN) bit-steps using a simple greedy algorithm. Since the declaration of unavailable switches takes just O(logN) bit-steps, and since the greedy routing algorithm is easily accomplished in O(logN) bit-steps, the entire process takes just O(logN) bit-steps.

It is not difficult to implement the circuit-switching algorithm for use with a multi-Benes network. Specifically, the definition of being blocked must be modified so that a node on level L is blocked if more than 2β−d−1 of its up (or down) neighbors on level L+1 are unavailable. (As before, it is assumed that β>d/2.) Available nodes are then guaranteed to have at least 2d−2 β+1 available neighbors. Hence, any set of k≦αM available inputs in an M-input splitter has a (α, 1/d) dispersion property, which is sufficient for the routing algorithm to work. Of course, it must also check that the modified definition of unavailable does not result in any inputs to the multi-Benes network becoming unavailable. See Arora, supra and Leighton, supra for details.

The above process can be applied in a fault tolerant environment by initially declaring all faulty switches as unavailable.

Although preferred embodiments have been specifically described and illustrated herein, it will be appreciated that many modifications and variations of the present invention are possible, in light of the above teachings, within the purview of the following claims, without departing from the spirit and scope of the invention.

We claim:

1. A switching network for routing messages comprising at least one logical cluster which comprises:

a) a first set of switches having N input switches for receiving messages and a second set of switches having approximately N output switches for outputting messages wherein the second set of switches is divided into at least two unique groups of switches; and b) connectors for connecting the first set of switches to the second set of switches wherein for every subset of input switches of size k of the first set of switches, there are at least x output switches in each group of the second set of switches that are connected to precisely one of the input switches of the subset of size k input switches, where k≦αN, x≦δαN, where k, x, and N are positive integers, N is equal to at least 8, where any particular subset includes any k of the N input switches, and where δ and α are positive constants less than one, such that the logical cluster exhibits a dispersion property.

2. A switching network as recited in claim 1 wherein the switching network is a multibutterfly switching network said multibutterfly switching network comprising a superposition of plural butterfly switching networks.

3. A switching network as recited in claim 1 wherein the switching network is a multi-Benes switching network, said multi-Benes switching network comprising a superposition of plural Benes switching networks.

4. A switching network as claimed in claim 1 comprised of a plurality of said logical clusters of switches that are interconnected by connections, each logical cluster further comprising controller means programmed to perform the following operations: declaring unusable switches as unavailable and, proceeding from an output level backward, declaring each switch unavailable if the switch does not have a sufficient quantity of connections to non-unavailable switches in each output group for each logical cluster, and avoiding switches declared unavailable in routing messages across the switching network.

5. A network as claimed in claim 4 wherein a busy switch or a faulty switch is unusable.

6. A network as claimed in claim 4 further comprising means for deactivating all switches in one of said logical clusters as well as all descendant switches connected to the outputs of said one of said logical clusters where a number of faulty input switches of that one of said logical clusters exceeds a predetermined threshold.

7. A network as claimed in claim 1 further comprising means for extending message paths between switches of the at least one logical cluster comprising:

means for sending a proposal from a current switch for each message path that is to be extended to each neighbor switch in a desired direction of extension;

means for returning an acceptance to the proposal to the current switch position from a neighbor switch if the neighbor receives exactly one proposal; and means for advancing each message path to include an accepting neighbor switch for each message path receiving exactly one acceptance.

8. A network as claimed in claim 7 further comprising means for sending placeholders on behalf of any message paths that are not moved forward such that the placeholders reserve a place at a switch to which the message path is to extend.

9. A switching network as claimed in claim 1 wherein the second set of switches is divided into at least two unique groups of switches and said at least one logical cluster exhibits an expansion property such that, for small subsets of k input switches, there are more than k switches in each unique group of the second set of switches connected to the subset of k input switches.

10. A switching network for routing messages comprising at least one logical cluster which comprises:

a) at least an input set of switches for receiving messages and at least one set of switches after the input set of switches, including an output set of switches for outputting messages, the output set of switches being divided into at least two unique groups of switches, each switch in the input set of switches and in the at least one set of switches after the input set of switches making local routing decisions; and b) connectors for connecting the sets of switches wherein there exists for every subset of switches of size k in the input set of switches at least $\beta k$ switches in each of said at least two unique groups of the output set of switches that can receive signals from the subset of k switches in the input set of switches, where $\beta > 1$, where k is a positive integer, and $k < \alpha N$ for N equal to the total number of switches in the input set of switches, N being equal to at least 8, and for $2\alpha < 1$, such that the logical cluster exhibits an expansion property.

11. A switching network as recited in claim 10 wherein the switching network is a multibutterfly switching network comprising a plurality of said logical clusters, said multibutterfly switching network comprising a superposition of plural butterfly switching networks.

12. A switching network as recited in claim 10 wherein the switching network is a twin butterfly switching network comprising a plurality of said logical clusters, said twin butterfly switching network comprising a superposition of two butterfly switching networks.

13. A switching network as recited in claim 10 wherein the switching network is a multi-Benes switching network comprising a plurality of said logical clusters, said multi-Benes switching network comprising a superposition of plural Benes switching network.

14. A switching network as recited in claim 10 wherein $\alpha$ is at least 0.1.

15. A switching network as recited in claim 14 where $\alpha$ is approximately equal to 0.1.

16. A switching network as recited in claim 10 wherein each switch of the input set of switches and in the at least one set of switches after the input set of switches has two inputs and two outputs.

17. A switching network as claimed in claim 10 wherein said at least one logical cluster exhibits a dispersion property such that for every small subset of k switches in the input set of switches there are plural switches in the output set of switches, each having only one of the input set of switches connected thereto.

18. A switching network for routing messages comprising at least one logical cluster which comprises:

an input set of switches equal in number to at least 8, having inputs for receiving messages and at least one set of switches after the input set of switches, including an output set of switches having outputs for outputting messages, wherein the output set of switches comprises at least two unique group of switches, each switch in the set of switches and in the at least one set of switches after the input set of switches making local routing decisions; and connectors for connecting switches in the logical cluster wherein for small subsets of size k of the input set of switches, there are more than k switches in each of said at least two unique groups of the output set of switches connected to the subsets of size k such that the logical cluster exhibits an expansion property.

19. A switching network as recited in claim 18 wherein said at least one logical cluster exhibits a dispersion property such that for each of said small subsets of switches of the input set of switches there are plural switches in the output set of switches each having only one of the input set of switches connected thereto.

* * * * *

UNITED STATES PATENT AND TRADEMARK OFFICE
CERTIFICATE OF CORRECTION

PATENT NO. : 5,521,591
DATED : May 28, 1996
INVENTOR(S) : Sanjeev Arora, Thomas F. Knight, Jr., Frank T. Leighton, Bruce M. Maggs and Eliezer Upfal It is certified that error appears in the above-indentified patent and that said Letters Patent is hereby corrected as shown below:

In column 1, line 11, insert the following paragraph:

---GOVERNMENT SUPPORT

This invention was made with government support; Air Force (Grant No. AFOSR-89-0271), Army (Contract No. DAAL-03-86-K-0171) and Navy (Grant Nos. N00014-87-K-0825 and N0014-89-J-1988). The government has certain rights in the invention.---

In column 17, line 22, change "$2\alpha< 1$" to ---$2\alpha\beta< 1$---.

In column 17, line 38, change "network" to ---networks---.

In column 18, line 22, change "group" to ---groups---.

Signed and Sealed this

Seventeenth Day of September, 1996

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,521,591
DATED : May 28, 1996
INVENTOR(S) : Sanjeev Arora, et al

It is certified that error appears in the above-indentified patent and that said Letters Patent is hereby corrected as shown below:

On title page, item [73] after "Mass." insert --and International Business Machines Corporation, Armonk, New York--

Signed and Sealed this

Fourth Day of February, 1997

Attest:

BRUCE LEHMAN

*Attesting Officer*     Commissioner of Patents and Trademarks